United States Patent [19]

Zetmeir

[11] 3,964,923

[45] June 22, 1976

[54] CONTROLLING PERMEABILITY IN SUBTERRANEAN FORMATIONS

[75] Inventor: Norris D. Zetmeir, Bartlesville, Okla.

[73] Assignee: Phillips Petroleum Company, Bartlesville, Okla.

[22] Filed: Jan. 13, 1975

[21] Appl. No.: 540,569

[52] U.S. Cl.............................. 106/189; 106/208; 106/213; 106/287 SS; 260/29.6 H; 166/294
[51] Int. Cl.$^2$...................... C08L 1/28; C08L 33/26
[58] Field of Search...... 106/189, 208, 213, 287 SS; 260/29.6 H; 166/294

[56] References Cited
UNITED STATES PATENTS

| | | | |
|---|---|---|---|
| 3,502,149 | 3/1970 | Pence | 166/295 |
| 3,696,035 | 10/1972 | Nimerick | 166/308 |
| 3,727,687 | 4/1973 | Clamplitt | 166/274 |
| 3,881,552 | 5/1975 | Hessert | 166/294 |

Primary Examiner—Theodore Morris

[57] ABSTRACT

The production of water in subterranean oil and gas formations is inhibited by the injection of a nonaqueous composition containing at least one crosslinkable polymeric material and a two-component catalyst system effective to cause in situ crosslinking of the polymeric material when contacted with water.

7 Claims, No Drawings

CONTROLLING PERMEABILITY IN SUBTERRANEAN FORMATIONS

This invention relates to the production of natural gas and oil.

One of the significant problems attendant to the production of oil and gas from subterranean hydrocarbon-containing formations is the concomitant production of water. Such produced water can be reservoir water, occasioned by coning or a similar phenomenon of the aquifier, or it can be injection water from secondary or tertiary recovery treatments being applied to the formation. Whatever the source, there is an upper limit beyond which water production can no longer be tolerated and its further entry into the producing well bore must at least be reduced if further production of the hydrocarbon resources at that location is to be continued.

Regardless of whether the undesired water is a natural drive fluid or an artificial drive fluid, such as from secondary or tertiary recovery projects, miscible displacement projects, etc., the problem is primarily occasioned by the predilection of the drive fluid to preferentially seek the higher permeability zone and to more or less bypass the lower permeability zones.

Among the prior solutions to the problem of undesirable water entry is the placing or forming of a plug within the formation. At one time, such plugs were solid, such as cement. Such solid plugs, however, while at least partially effective for the intended purpose, inhibit the use of the undesirable fluid to assist in driving the desired fluid from the formation into the producing well bore. Additionally, should the undesirable fluid seep by or otherwise bypass such solid plugs, the plug cannot change or shift position to block such seepage or other changes in fluid flow of the undesired fluid.

To overcome the shortcomings of the use of solid plugs such as cement, there has developed the concept of modifying the mobility of fluids present in the subterranean formations. Such methods have generally been directed to modifying the mobility of the hydrocarbon-displacing medium, whether it be a gas or a liquid. Since the mobility of any fluid in a permeable geological formation is the effective permeability of the formation to that fluid divided by the viscosity of the fluid, a commonly developed method for reducing the mobility of a fluid in a permeable formation is to increase its viscosity. Such an increase in viscosity is generally accomplished by using viscous solutions of high molecular weight polymers such as polyacrylamides, cellulose ethers, polysaccharides and the like. Such polymeric solutions have been found effective for reducing the water-oil ratio in the total producing well effluent, and for increasing the daily production of hydrocarbonaceous fluids.

In actual field practice, however, such mobility altering polymers elute out of the producing wells quickly, generally on the order of from 15 to 150 days, and the water-oil ratios rapidly rise back to an undesirable level, necessitating retreatment of the producing interval with the viscous polymer solutions.

It is therefore an object of this invention to provide a method for controlling the permeability of a subterranean formation of nonuniform permeability. Another object is to provide a method of selectively plugging the more permeable water channels of a subterranean formation. Another object is to provide an improved waterflooding process wherein the displacement fluid pattern is controlled by selectively plugging the permeable water channels. A further object is to provide a method of controlling water intrusion into a producing well. A still further object is to provide a nonaqueous sealing composition.

These and other objects, aspects and advantages of this invention will be readily apparent to those skilled in the art from the reading of the following disclosure.

In accordance with the present invention there is provided a non-aqueous sealing composition which is readily pumpable, is easily emplaced and which forms a gel upon contact with water. The nonaqueous sealing composition of the present invention comprises at least one chemically crosslinkable, at least water dispersible polymer, an oxidizing agent, a reducing agent and at least one monohydric aliphatic alcohol.

The invention also provides a method of preferentially inhibiting water production from a subsurface formation. Broadly, the fluid permeability of subterranean formations penetrated by one or more injection and/or producing well bores can be modified by treating such formations through such well bores with the nonaqueous composition of this invention under conditions such that crosslinking or gelation of the polymer is effected in situ within the formation upon contact of the nonaqueous composition with water.

In the practice of this invention, the nonaqueous composition can be injected into the formation employing conventional pumping equipment, at any suitable rate and at any suitable pressure. In general, the injection rate will be in the range of 0.1 to about 50 barrels per minute, preferably 0.5 to 5 barrels per minute.

The amount of the nonaqueous composition and the concentrations of the individual components used in the practice of this invention are functions of the type of formation being treated, the porosity and permeability of such formation and, particularly, the level of permeability modification desired. The reservoir permeability of a particular formation can be determined by methods known in the art. For example, a known-sized slug of water containing a marking agent such as a water-soluble dye or a radioactive tracer can be injected, followed by continued injection of water until the marking agent is detected at the offending producing well. The amount of following water so injected will provide an estimate of the reservoir pore volume that is channeling the injection fluid between the injection well and the producing well; additionally, such amount provides an approximation of the formation flow capacitance of that portion of the reservoir.

When the nonaqueous compositions of the present invention are injected down a producing well bore to reduce the water:oil ratio in and around the well bore, it may be desirable to precede the nonaqueous sealing composition with a slug of flush liquid, such as oil, to clear the perforations around the well bore.

It may be further desirable to follow the nonaqueous composition with a slug of flush liquid such as oil to clear the perforations. Otherwise, the perforations could be blocked or partially restricted when the polymeric composition mixes and crosslinks to form a viscous or firm gel.

In some instances, depending upon the type of formation, deeply placed compositions, i.e., compositions displaced out into the formation away from the well bore a distance of 60 to 200 feet or more, can be employed. Thus, the afterflush of oil would be sufficient to not only clear the perforations but also to displace the composition out into the formation a desired distance.

The polymeric materials which are suitable for use in the practice of this invention include at least water-dispersible polymers selected from the group consisting of polyacrylamides, cellulose ethers and polysaccharides. As used herein, and in the claims, the term "polymer" is employed generally to include both homopolymers and copolymers. The term "water-dispersible polymer" is employed to include those polymers which are truly water soluble and those which are dispersible in water to form stable collodial suspensions. The term "water-dispersible polymer" is a term of art which describes the action of such polymers when contacted with water; it is used herein to describe the class of polymers useful in this invention. The term "water" is employed generally to include fresh water and brines containing a wide range of dissolved solids.

The term "polyacrylamide" as used herein and in the claims, includes various homopolymers and copolymers of acrylamide or methacrylamide. The term also includes polyacrylamides and polymethacrylamides wherein up to about 75 percent of the carboxamide groups can be hydrolyzed to carboxyl groups; cross-linked polyacrylamides and crosslinked polymethacrylamides wherein up to about 75 percent of the carboxamide groups can be hydrolyzed to carboxyl groups; polymers of N-substituted acrylamides wherein the nitrogen atoms in the carboxamide groups can have from 1 to 2 alkyl substituents which contain from 1 to 4 carbon atoms; copolymers of acrylamide with another ethylenically unsaturated monomer copolymerizable therewith, sufficient acrylamide being present in the monomer mixture to impart said water-dispersible properties to the resulting copolymers when it is mixed with water, and wherein up to about 75 percent of the carboxamide groups can be hydrolyzed to carboxyl groups; and admixtures of such polymers. The presently preferred polyacrylamide-type polymers include the various substantially linear homopolymers and copolymers of acrylamide and methacrylamide. By "substantially linear" it is meant that the polymers are substantially free of crosslinking between the polymer chains. Such polymers can have up to about 75, preferably up to about 45, percent of the carboxamide groups hydrolyzed to carboxyl groups. As used herein, unless otherwise specified, the term "hydrolyzed" includes modified polymers wherein the carboxyl groups are in the acid form and also such polymers wherein the carboxyl groups are in the salt form, providing such salts are at least water-dispersible. Such salts include the ammonium salts, the alkali-metal salts and others which are at least water-dispersible. Hydrolysis can be carried out in any suitable fashion, as for example, by heating an aqueous solution of the polymer with a suitable amount of sodium hydroxide.

Representative cellulose ethers which can be used in the practice of the present invention include, inter alia, the various carboxyalkyl cellulose ethers, e.g., carboxyethyl celluloses and carboxymethyl celluloses (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose and hydroxypropyl cellulose; alkylhydroxyalkyl cellulose such as methylhydroxypropyl cellulose; alkyl cellulose such as methyl cellulose, ethyl cellulose, and propyl cellulose; alkylcarboxyalkyl cellulose such as ethylcarboxymethyl cellulose; alkylalkyl celluloses such as methylethyl cellulose; and the like. Many of said cellulose ethers are available as the alkali metal salt, usually the sodium salts. However, the metal is seldom referred to and they are commonly referred to as CMC for carboxymethyl cellulose, CMHEC for carboxymethylhydroxyethyl cellulose, etc. For example, water-soluble CMC is available in various degrees of carboxylate substitution. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above-preferred ranges is usually less uniform in properties and thus less desirable. CMC having a degree of substitution greater than the above preferred ranges usually has a lower viscosity and more is required in preparing suitable aqueous compositions. Said degree of substitution of CMC is commonly designated in practice as CMC-7, CMC-9, CMC-12, etc., wherein the 7, 9, and 12 refer to a degree of substitution of 0.7, 0.9, and 1.2 respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 3.

Representative of the polysaccharides which can be used in forming the polymeric compositions of this invention are the heteropolysaccharides produced by fermentation of carbohydrates by bacteria of the genus Xanthomonas. Exemplary of such heteropolysaccharides are those produced by *Xanthomonas campestris*, *Xanthomonas begonia*, *Xanthomonas phaseoli*, *Xanthomonas hederae*, *Xanthomonas incanae*, *Xanthomonas carotae*, and *Xanthomonas translucens*. Of these, ionic polysaccharide B-1459 is preferred. The polysaccharide B-1459 is prepared by culturing the bacterium Xanthomonas campestris NRRL B-1459, United States Department of Agriculture, on a well-aerated medium containing commercial glucose, organic nitrogen sources, dipotassium hydrogen phosphate, and various trace elements. Fermentation is carried out to completion in 4 days or less at a pH of about 7 and a temperature of 28°C.

In addition to being at least water-dispersible, the polymers useful in the practice of the invention are characterized by high molecular weight. The molecular weight is not critical so long as the polymer has the above-described at least water-dispersible properties. It is preferred that the polymer have a molecular weight of at least 100,000. The upper limit of molecular weight is unimportant so long as the polymer is at least water-dispersible. Thus, polymer having molecular weights as high as 20,000,000 or higher, and meeting said conditions, can be used.

The amount of such polymers used in the practice of the invention can vary widely depending on the particular polymer used, the purity of said polymer and properties desired in the resulting crosslinked composition. In general, the amount of polymer used in preparing the nonaqueous compositions will be that amount which, if prepared with an equal weight of water, would be a water-thickening amount, i.e., at least an amount which would significantly thicken the water to which it was added. Generally speaking, amounts in the range of 0.0025 to 20, preferably 0.01 to 10, weight percent, based upon the weight of nonaqueous medium, can be used in the practice of this invention. However, amounts outside these ranges can be used.

The oxidizing agent which is used in the nonaqueous compositions of the present invention is a water-soluble compound of a polyvalent metal wherein the metal is present in its highest valence state, is capable of being reduced to a lower polyvalent valence state and is in a form normally unavailable for reaction, such as combined with oxygen. Examples of such compounds include potassium permanganate, sodium permanganate, ammonium dichromate, the alkali metal chromates and dichromates, and chromium trioxide. Because of their low cost and ready availability, sodium dichromate and potassium dichromate are the presently preferred oxidizing agents.

The amount of oxidizing agent used in the practice of this invention will be a sensible amount, i.e., a small but finite amount which is more than incidental impurities, but which is effective or sufficient to cause subsequent gellation of the polymer when the metal in the oxidizing agent is reduced to a lower polyvalent valence state. The lower limit of the concentration of the oxidizing agent will depend upon several factors including the particular type of polymer or mixture of polymers used, the concentration of the polymer in the nonaqueous medium, the particular medium used and the extent of crosslinking desired. Similarly, the upper limit of concentration of the oxidizing agent cannot be precisely defined. In general, however, the amount of oxidizing agent used in preparing the nonaqueous sealing compositions of this invention will be in the range of from about 0.05 to about 75, preferably from about 0.5 to about 40, weight percent of the amount of polymer used. Stated another way, the amount of the oxidizing agent will usually be an amount sufficient to provide at least $3 \times 10^{-6}$, preferably at least $3 \times 10^{-5}$, gram-atoms of the metal capable of being reduced per gram of polymer. The use of amounts of oxidizing agent outside the above ranges is within the scope of the invention. Those skilled in the art can determine the amount of starting polyvalent metal-containing oxidizing agent to be used by simple experiments carried out in light of this disclosure.

The reducing agent which is used in the nonaqueous compositions of the present invention is a compound capable of reducing the polyvalent metal in the oxidizing agent to a lower polyvalent valence state. Examples of suitable reducing agents include compounds such as sodium sulfide, sodium hydrosulfite, sodium metabisulfite, potassium sulfite, sodium bisulfite, potassium metabisulfite, sodium sulfite, sodium thiosulfate, ferrous sulfate, thioacetamide, hydrogen sulfide and the like. Because of their low cost and ready availability the presently preferred reducing agents are sodium bisulfite, sodium hydrosulfite and potassium hydrosulfite.

The amount of reducing agent to be used in the practice of this invention will also be a sensible amount, i.e., a small but finite amount which is more than incidental impurities, but which is effective or sufficient to reduce at least a portion of the higher valence metal in the polyvalent metal oxidizing agent to a lower polyvalent valence state. Thus, the amount of reducing agent to be used depends, to some extent at least, upon the amount of the starting polyvalent metal containing oxidizing agent. In many instances, it will be necessary to use an excess of reducing agent to compensate for loss due to exposure to air during preparation of the compositions and possible contact with other oxidizing substances such as might be encountered in field operations. In general, the amount of reducing agent used will be in the range of from about 0.1 to about 300, preferably to about 200, weight percent of the stoichiometric amount required to reduce the metal in the starting polyvalent metal-containing oxidizing agent to a lwer polyvalent valence state, e.g., chromium + 6 to chromium + 3. In some instances it may be desirable to use amounts of reducing agent outside the ranges set forth. The use of such amounts is within the scope of this invention. Those skilled in the art can determine the amount of reducing agent to be used by simple experiments carried out in light of this disclosure.

The monohydric alcohols suitable for use in the present invention have 1–4 carbon atoms and must be sufficiently soluble in water to be completely dissolved at the concentration present in the formation and essentially water-free. The alcohols must be sufficiently soluble in water so that when the sealing compositions of this invention contact formation water, a gel can form. The alcohol must be essentially water-free to prevent premature gelation of the composition. Examples of alcohols suitable for use in this invention include methanol, ethanol, propanol, isopropanol and isobutanol.

Various methods can be used for preparing the nonaqueous compositions of this invention. For example, the polymer can be admixed with the alcohol, followed by the reducing agent, then the oxidizing agent. The dry components can also be premixed, then added to the alcohol at a later time.

An advantage of the present invention is that ordinary ambient temperatures and other conditions can be used in practically instances in preparing the nonaqueous compositions used in the present invention.

The polymer compositions of the present invention are particularly useful in fluid drive operations for the secondary recovery of oil. In a formation where the oil-bearing strata are interspersed with more permeable porous strata which contain no oil, or an insufficient quantity of oil to make secondary recovery operations economical, the formation can be treated according to this invention to alter the permeability of the more permeable strata.

The following examples illustrate the invention:

EXAMPLE I

A nonaqueous sealing composition was prepared according to the following recipe:
125 ml. methanol
1.25 g sodium carboxymethyl cellulose having a degree of substitution of about 0.9
0.5 g sodium dichromate
0.5 g sodium bisulfite The above ingredients were admixed with stirring in the order listed.

125 ml of deionized water were then added to the nonaqueous composition. Within about 30 minutes, a firm gel formed.

Reasonable variations and modifications, which will be apparent to those skilled in the art, can be made in this invention without departing from the spirit and scope thereof.

I claim:

1. A nonaqueous fluid composition, which, on admixing with water forms a water-impermeable gel, consisting of:
   a. at least one water-soluble or at least water-dispersible polymeric material selected from the group consisting of polyacrylamides, cellulose ethers and polysaccharides;
   b. an oxidizing agent selected from the group consisting of water-soluble compounds of polyvalent metals wherein the metal is present in its highest valence state, is capable of being reduced to a lower polyvalent valence state and is in a form normally unavailable for reaction until contacted with a reducing agent;
   c. a reducing agent effective to reduce the higher valence metal in said oxidizing agent (b) to a lower polyvalent valence state; and
   d. at least one monohydric aliphatic alcohol having from 1 to 4 carbon atoms in amounts of each component identified as (a) to (d) as follows: from 0.0025 to 20 parts of component (a) per 100 parts of component (d); an amount of component (b) at least sufficient to yield $3 \times 10^{-6}$ gram-atoms of said metal (b) per gram of polymeric material (a); and an amount of component (c) at least sufficient to reduce said metal of said component (b) to a lower polyvalent valence state.

2. The composition of claim 1 wherein the amount of said polymeric material (a) is in the range of from 0.01 to 10 parts per 100 parts of component (d).

3. The composition of claim 2 wherein said polymer (a) is carboxymethylcellulose, said oxidizing agent (b) is sodium dichromate, said reducing agent (c) is sodium hydrosulfite and said monohydric alcohol (d) is methanol.

4. A method for preferentially inhibiting production of water from a subsurface fluid hydrocarbon productive formation, the producing interval of which includes a watered-out portion and a portion capable of producing a substantial percentage of fluid hydrocarbon, comprising the steps of treating the producing interval by introducing into it a nonaqueous treating fluid, which on contact with water forms a water-permeable gel, then terminating the injection of said treating fluid and thereafter placing the treated formation on production, said treating fluid consisting of:
   a. at least one water-soluble or at least water-dispersible polymeric material selected from the group consisting of polyacrylamides, cellulose ethers and polysaccharides;
   b. an oxidizing agent selected from the group consisting of water-soluble compounds of polyvalent metals wherein the metal is present in its highest valence state, is capable of being reduced to a lower polyvalent valence state and is in a form normally unavailable for reaction until contacted with a reducing agent;
   c. a reducing agent effective to reduce the higher valence metal in said oxidizing agent (b) to a lower polyvalent valence state; and
   d. at least one monohydric aliphatic alcohol having from 1 to 4 carbon atoms in amounts of each component identified as (a) to (d) as follows: from 0.0025 to 20 parts of component (a) per 100 parts of component (d); an amount of component (b) at least sufficient to yield $X \quad 10^{-6}$ gram-atoms of said metal (b) per gram of polymeric material (a); and an amount of component (c) at least sufficient to reduce said metal of said component (b) to a lower polyvalent valence state.

5. The method of claim 4 wherein said polymer (a) is carboxymethylcellulose, said oxidizing agent (b) is sodium dichromate, said reducing agent (c) is sodium hydrosulfite and said monohydric alcohol (d) is methanol.

6. A method for selectively plugging the permeable water channels of a subsurface formation of nonuniform permeability penetrated by at last one well which comprises:
   introducing a nonaqueous treating fluid which, on contact with water, forms a water-impermeable gel;
   displacing said fluids into said formation a distance from said well; and
   thereafter placing the treated formation on production;
   said treating fluid consisting of
   a. at least one water-soluble or at least water-dispersible polymeric material selected from the group consisting of polyacrylamides, cellulose ethers and polysaccharides;
   b. an oxidizing agent selected from the group consisting of water-soluble compounds of polyvalent metals wherein the metal is present in its highest valence state, is capable of being reduced to a lower polyvalent valence state and is in a form normally unavailable for reaction until contacted with a reducing agent;
   c. a reducing agent effective to reduce the higher valence metal in said oxidizing agent (b) to a lower polyvalent valence state; and
   d. at least one monohydric aliphatic alcohol having from 1 to 4 carbon atoms in amounts of each component identified as (a) to (d) as follows: from 0.0025 to 20 parts of component (a) per 100 parts of component (d); an amount of component (b) at least sufficient to yield $3 \times 10^{-6}$ gram-atoms of said metal (b) per gram of polymeric materials (a); and an amount of component (c) at least sufficient to reduce said metal of said component (b) to a lower polyvalent valence state.

7. The method of claim 6 wherein said polymer (a) is carboxymethylcellulose, said oxidizing agent (b) is sodium dichromate, said reducing agent (c) is sodium hydrosulfite and said monohydric alcohol (d) is methanol.

* * * * *

UNITED STATES PATENT AND TRADEMARK OFFICE
CERTIFICATE OF CORRECTION

PATENT NO. : 3,964,923
DATED : June 22, 1976
INVENTOR(S) : Norris D. Zetmeir

It is certified that error appears in the above-identified patent and that said Letters Patent are hereby corrected as shown below:

Column 8, claim 4, element d, line 9, after "yield" and before "X" should be --- 3 ---.

Signed and Sealed this

Twenty-first Day of September 1976

[SEAL]

Attest:

RUTH C. MASON
Attesting Officer

C. MARSHALL DANN
Commissioner of Patents and Trademarks